(12) United States Patent
Sugaya et al.

(10) Patent No.: US 6,694,139 B1
(45) Date of Patent: Feb. 17, 2004

(54) WIRELESS COMMUNICATION APPARATUS AND METHOD, AND CABLE COMMUNICATION APPARATUS

(75) Inventors: Shigeru Sugaya, Kanagawa (JP); Hidemasa Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 09/679,481

(22) Filed: Oct. 4, 2000

(30) Foreign Application Priority Data

Oct. 6, 1999 (JP) .......................................... P11-285745

(51) Int. Cl.[7] .................................................. H04Q 7/20
(52) U.S. Cl. ........................................ 455/450; 370/329
(58) Field of Search ........................... 455/6.2, 6.3, 66, 455/74, 57, 450, 464, 557, 3.06; 370/329, 330, 345, 348, 350

(56) References Cited

U.S. PATENT DOCUMENTS 6,011,784 A * 1/2000 Brown et al. ................ 370/329
6,288,800 B1 * 9/2001 Izumi ......................... 358/468

* cited by examiner

Primary Examiner—Nay Maung
Assistant Examiner—Tu Nguyen
(74) Attorney, Agent, or Firm—Jay H. Maioli

(57) ABSTRACT

A cable communication apparatus includes a wireless reception unit for establishing a predetermined wireless communication data structure and receiving wireless communication band acquiring request information transmitted from a wireless communication apparatus, a first wireless transmission unit for wirelessly transmitting wireless communication band assignment information based on the wireless communication band acquiring request information, a cable reception unit for receiving isochronous communication information transmitted from various devices connected thereto via a high-speed serial bus, an information converting unit for converting the isochronous communication information into data information arranged in units of blocks based on a predetermined format established in accordance with the wireless communication band assignment information, and a second wireless transmission unit for wirelessly transmitting the data information.

10 Claims, 15 Drawing Sheets

FIG. 4

| PACKET ID | RESERVATION STATION ID | SOURCE ID | DESTINATION ID | REQUEST ID | RESERVATION BANDWIDTH ID |

FIG. 5

| PACKET ID | RESERVATION STATION ID | SOURCE ID | DESTINATION ID | REQUEST ID | RESERVATION BANDWIDTH ID | RESERVED ID | ASSIGNED SLOT INFORMATION |

FIG. 10

CYCLE 1

| DATA LENGTH | TAG | CHANNEL | T CODE | S CODE |
|---|---|---|---|---|
| HEADER CRC ||||||
| DATA BLOCK PAYLOAD ||||||
| DATA CRC ||||||

CYCLE 2

| DATA LENGTH | TAG | CHANNEL | T CODE | S CODE |
|---|---|---|---|---|
| HEADER CRC ||||||
| DATA BLOCK PAYLOAD ||||||
| DATA CRC ||||||

CYCLE 3

| DATA LENGTH | TAG | CHANNEL | T CODE | S CODE |
|---|---|---|---|---|
| HEADER CRC ||||||
| DATA BLOCK PAYLOAD ||||||
| DATA CRC ||||||

CYCLE 4

| DATA LENGTH | TAG | CHANNEL | T CODE | S CODE |
|---|---|---|---|---|
| HEADER CRC ||||||
| DATA BLOCK PAYLOAD ||||||
| DATA CRC ||||||

WIRELESS COMMUNICATION APPARATUS AND METHOD, AND CABLE COMMUNICATION APPARATUS

BACKGROUND OF THE INVENTION

1. Field of the Invention

The present invention relates to a communication method which is applied to a case in which data transmitted via a cable-communication channel is transferred via a wireless communication channel, and relates to a communication apparatus to which the communication method is applied.

2. Description of the Related Art

As a conventional communication method among a plurality of apparatuses for exchanging data having a relatively large amount of information such as digital image data, computer programs, and file data, one using an IEEE-1394 high-speed serial bus interface has been developed. The IEEE-1394 high-speed serial bus interface allows packet-structured data to be transmitted to a desired apparatus from among a plurality of apparatuses which are connected to the serial bus for data communication.

Data communication using the IEEE-1394 high-speed serial bus interface offers two communication modes: one is an isochronous communication mode for successively transmitting the data having a relatively large amount of information such as image data; the other is an asynchronous communication mode for randomly and reliably transmitting data having a relatively small amount of information such as control data.

Data communication using the IEEE-1394 high-speed serial bus interface enables various data to be exchanged among the apparatuses connected to the serial bus line.

Generally, when a wireless communication frame is established, the wireless communication frame is established so as to have a communication period which is greater by several orders of magnitude than the period of a cable-environment communication cycle (approximately a 125 $\mu$s unit), that is, for example, a 4 ms unit. Since conversion processing for converting cable-environment data into a communication signal formatted for a wireless-environment and other coding and decoding processing require some time, the wireless communication frame depends on the operating times of various control apparatuses. Therefore, it is difficult to perform data communication via the wireless communication channel without directly converting the cable-environment data.

When being performed in the cable environment, it is required that a band having a size corresponding to the amount of transmission is established beforehand and the isochronous communication is performed so that the amount of transmission does not exceed the established band. Likewise, when being performed in the wireless environment, it is required that a band for wirelessly transmitting data is reserved and the isochronous communication is performed so that the amount of transmission does not exceed the reserved band. In addition, when the isochronous communication is performed in the cable environment, an isochronous packet is transmitted every communication cycle (approximately a 125 $\mu$s unit).

When the isochronous information transmitted via the cable environment is transmitted via the wireless communication channel, a wireless communication apparatus on the sending side transmits information via the wireless communication channel in which the isochronous information arranged in units of communication cycles is packed in units of communication frames (for example, 4 ms unit) in the wireless environment. A wireless communication apparatus on the receiving side reconstructs the isochronous information in units of communication cycles in the cable environment.

In the cable-environment isochronous communication, the amount of information can be variable during one communication cycle in the cable environment. That is, the entirety, a half, or none of the reserved band which is occupied by the isochronous information can be transmitted during every cycle.

Accordingly, the wireless communication apparatus on the sending side must inform the other apparatus on the receiving side of how often and how much cable-environment isochronous information is contained in a wireless-environment packet which contains isochronous packets corresponding to a plurality of cable cycles. Such information processing becomes redundant over a long period of the isochronous transmission.

SUMMARY OF THE INVENTION

In view of the foregoing problem, a first object of the present invention is to provide a wireless communication method which guarantees the equivalent communication band in cable-environment isochronous communication because, before transmitting isochronous information via a wireless channel, a band required for wireless communication can be reserved and can be used exclusively for wireless communication.

It is another object of the present invention to provide a wireless communication method which enables stable isochronous communication to be performed by informing corresponding communication apparatuses on both sending and receiving sides of information on the communication band used for the wireless communication before isochronous information is wirelessly transmitted.

It is a further object of the present invention to provide a wireless communication method which enables communication bands to be repeatedly used by releasing a corresponding reserved communication band at the end of the isochronous communication.

To this end, according to a first aspect of the present invention, there is provided a wireless communication method for a control station which controls a wireless network including the control station and at least one communication station. The wireless communication method comprising the steps of receiving a communication band reservation request from a communication station which desires to perform isochronous communication, assigning a wireless communication band for the communication station and notifying the band assignment to the communication station when the band can be reserved, and allowing the communication station to perform isochronous communication using the assigned wireless communication band when the band can be reserved.

According to a second aspect of the present invention, there is provided a wireless communication method for a communication station used in a wireless network comprising a control station and the communication station. The wireless communication method includes the steps of transmitting to the control station a band reservation transmission request transmitted from a terminal connected thereto via a high-speed serial bus, receiving a communication band assignment notification from the control station, and performing isochronous transmission in the communication band assigned in accordance with the communication band assignment notification.

According to a third aspect of the present invention, a wireless communication apparatus includes a wireless reception unit for establishing a predetermined wireless communication data structure and receiving wireless communication band assignment information, a cable reception unit for receiving isochronous communication information transmitted from various devices connected thereto via a high-speed serial bus, an information converting unit for converting the isochronous communication information into data information arranged in units of blocks based on a predetermined format established in accordance with the wireless communication band assignment information, and a wireless transmission unit for wirelessly transmitting the data information.

According to a fourth aspect of the present invention, a cable communication apparatus includes a first wireless reception unit for establishing a predetermined wireless communication data structure and receiving wireless communication band assignment information, a second wireless reception unit for receiving data information transmitted via a predetermined wireless communication channel, an information converting unit for converting wireless communication data information arranged in units of blocks based on a predetermined format established in accordance with the wireless communication band assignment information into periodical cable-environment isochronous communication information, and a cable transmission unit for transmitting the isochronous communication information to various devices connected thereto via a high-speed serial bus.

According to a fifth aspect of the present invention, a wireless communication apparatus includes an information detecting unit for detecting isochronous communication band reservation information transmitted from various devices connected thereto via a high-speed serial bus, a first wireless transmission unit for wirelessly transmitting, to a wireless communication apparatus serving as a control station, a request for acquiring a wireless communication band required for wireless communication based on the detected isochronous communication band reservation information, a wireless reception unit for establishing a predetermined wireless communication data structure and receiving wireless communication band assignment information, a cable reception unit for receiving isochronous communication information transmitted from various devices connected thereto via the high-speed serial bus, an information converting unit for converting the isochronous communication information into data information arranged in units of blocks based on a predetermined format established in accordance with the wireless communication band assignment information, and a second wireless transmission unit for wirelessly transmitting the data information.

According to a sixth aspect of the present invention, a cable communication apparatus includes a wireless reception unit for establishing a predetermined wireless communication data structure and receiving wireless communication band acquiring request information transmitted from a wireless communication apparatus, a first wireless transmission unit for wirelessly transmitting wireless communication band assignment information based on the wireless communication band acquiring request information, a cable reception unit for receiving isochronous communication information transmitted from various devices connected thereto via the high-speed serial bus, an information converting unit for converting the isochronous communication information into data information arranged in units of blocks based on a predetermined format established in accordance with the wireless communication band assignment information, and a second wireless transmission unit for wirelessly transmitting the data information.

According to a seventh aspect of the present invention, a cable communication apparatus includes a first wireless reception unit for establishing a predetermined wireless communication data structure and receiving wireless communication band acquiring request information transmitted from another wireless communication apparatus, a wireless transmission unit for wirelessly transmitting wireless communication band assignment information based on the wireless communication band acquiring request information, a second wireless reception unit for receiving data information transmitted via a predetermined wireless communication channel, an information converting unit for converting the wireless communication data information arranged in units of blocks based on a predetermined format established in accordance with the wireless communication band assignment information into periodical cable-environment isochronous communication information, and a cable transmission unit for transmitting the isochronous communication information to various devices connected thereto via a high-speed serial bus.

Further objects, features, and advantages of the present invention will become apparent from the following description of the preferred embodiments with reference to the attached drawings.

BRIEF DESCRIPTION OF THE DRAWINGS

FIG. 4 is a diagram illustrating a band reservation request packet according to the embodiment;

FIG. 5 is a diagram illustrating a band assignment packet according to the embodiment;

FIG. 10 is a diagram illustrating an example structure of the cable isochronous information according to the embodiment;

DESCRIPTION OF THE PREFERRED EMBODIMENT

Hereinafter, the embodiment of the present invention is described. Before isochronous information is wirelessly transmitted, a communication band required for wireless communication is reserved between a source wireless communication apparatus (hereinafter referred to as a talker) and a destination wireless communication apparatus (hereinafter referred to as a listener).

Since the communication band is reserved for wireless communication of the isochronous information, a method for effectively using this reserved communication band can be established. Specifically, a packet for wireless communication is constructed by dividing the reserved communication band by the number of cable environment communication cycles (hereinafter referred to as cable cycles) and storing data in a buffer according to the order of cable cycles. That is, when the entirety of the buffer is not occupied by data of one cycle, data of another cycle is not packed onto the unused remaining part of the buffer. Instead, a fixed-length buffer is provided having information on the size of data contained in each of the cycles in order to access data of the cycles.

Figure 1:
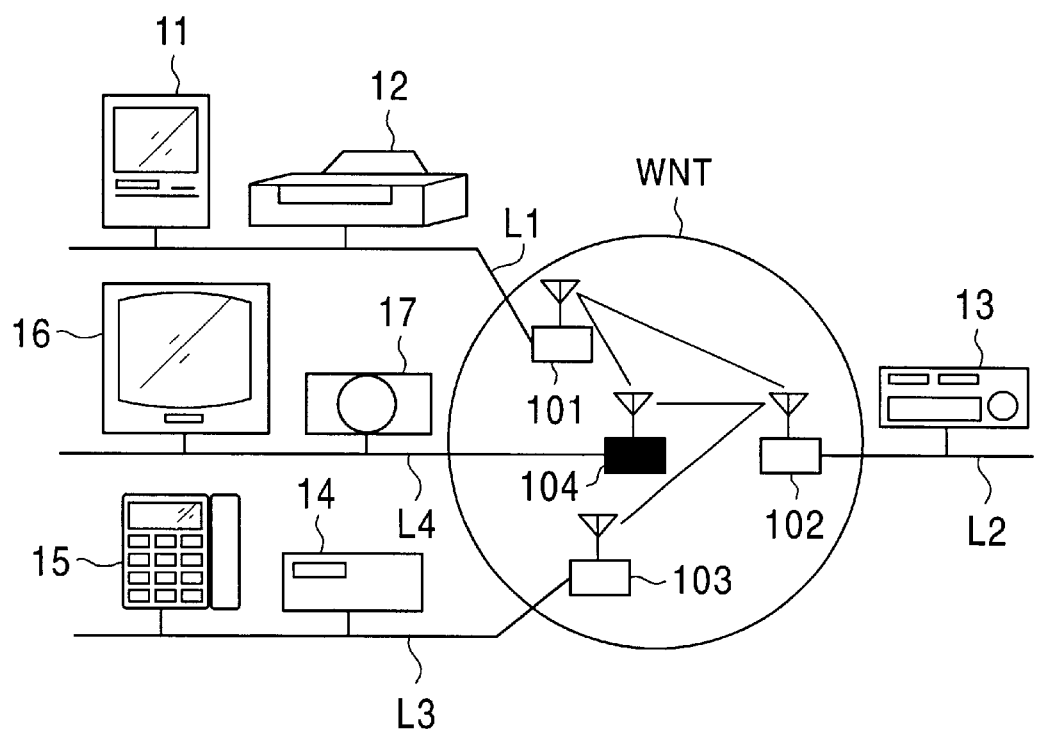
FIG. 1 is a block diagram of a wireless communication network system according to an embodiment of the present invention.

FIG. 1 shows a wireless network system. In FIG. 1, a wireless communication network (WNT) includes wireless communication apparatuses 101 to 104 having a transmission/reception antenna in which the wireless communication apparatus 104 serves as a control station and the wireless communication apparatuses 101 to 103 serve as terminal communication stations.

The wireless communication apparatus 101 is connected via a cable L1 to, for example, a personal computer 11 and a printer 12.

The wireless communication apparatus 102 is connected via a cable L2 to, for example, a magnetic recording/playback apparatus 13.

The wireless communication apparatus 103 is connected via a cable L3 to, for example, a set-top box 14 and a telephone 15. The set-top box 14 is an interface for exchanging a signal between a broadcasting station and a residence. A CATV line is connected to a television set whereby the set-top box 14 is used as a residential adapter or the like for controlling many broadcast programs.

The wireless communication apparatus 104 is connected via a cable L4 to, for example, a television set 16 and a game console system 17.

In the wireless communication network WNT, the wireless communication apparatus 104 (the control station) can communicate with the wireless communication apparatuses 101 to 103 (the terminal communication stations). The wireless communication apparatus 101 can directly communicate with the wireless communication apparatuses 102 and 104, but cannot directly communicate with the wireless communication apparatus 103 which is at a remote site. When the wireless communication apparatus 101 desires to communicate with the wireless communication apparatus 103, the wireless communication apparatus 101 communicates with the wireless communication apparatus 103 via the communication apparatus 104 (the control station). The wireless communication apparatus 102 can communicate with the wireless communication apparatuses 101, 103, and 104. The wireless communication apparatus 103 can communicate with the wireless communication apparatuses 102 and 104, and cannot directly communicate with the wireless communication apparatus 101 on the remote site. When the wireless communication apparatus 103 desires to communicate with the wireless communication apparatus 101, the wireless communication apparatus 103 communicates with the wireless communication apparatus 101 via the wireless communication apparatus 104.

For example, it is assumed that the personal computer 11 requests the set-top box 14 to transmit a particular program to the magnetic recording/playback apparatus 13 in an isochronous mode and requests the magnetic recording/playback apparatus 13 to record the program therein. In this case, the wireless communication apparatus 101 requests the wireless communication apparatus 104 to reserve a wireless-environment communication band.

The wireless communication apparatus 104 (the control station) informs the wireless communication apparatus 103 (the talker) and the wireless communication apparatus 102 (the listener) to transmit and receive isochronous information, respectively.

The wireless communication apparatuses 102 and 103 obtain their wireless communication bands after acknowledging. In the wireless communication apparatus 103 (the talker), isochronous information transmitted via the cable L3 from the set-top box 14 is converted into wireless-environment packets. The wireless communication apparatus 102 (the listener) receives the packets, converts them into the cable-environment isochronous information, and transmits them to the magnetic recording/playback apparatus 13.

When this particular program is over and the corresponding isochronous transmission is complete, in accordance with a request from the personal computer 11 or the set-top box 14, the wireless communication apparatus which is connected thereto requests the wireless communication apparatus 104 (the control station) to release the corresponding isochronous communication band. The wireless communication apparatus 104 (the control station) releases the corresponding isochronous communication band.

Figure 2:
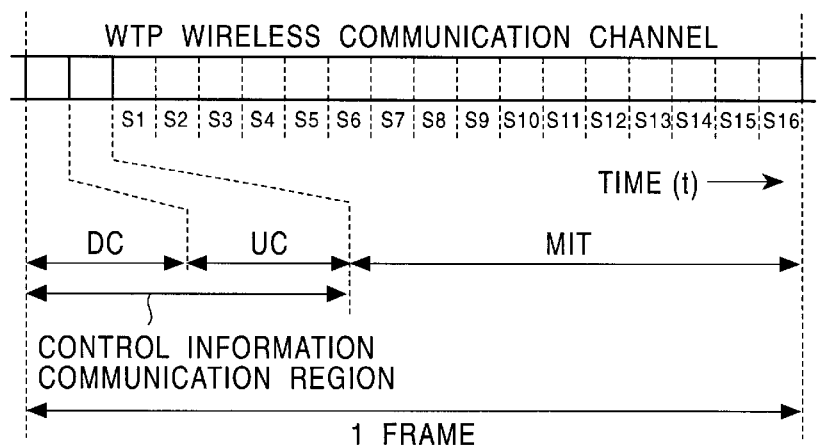
FIG. 2 is a diagram illustrating a wireless transmission frame according to the embodiment.

FIG. 2 shows the arrangement of signal exchanging between the control station (the wireless communication apparatus 101) and the terminal communication stations (the wireless communication apparatuses 101 to 103) of the WNT shown in FIG. 1. Data communication is arranged to be performed by establishing a frame period. That is, as shown in FIG. 2, a predetermined period is established as one frame period. A predetermined interval of the header of one frame period is assigned as a control information communication region which includes a downstream control region DC and an upstream control region UC.

Information on a method to use the wireless communication frame, such as configuration information of the wireless communication network and slot assignment information of the information communication region, is transmitted using the downstream control region DC. All the wireless communication apparatuses 101 to 104 exchange information such as the condition of the apparatus in a time-division manner using the upstream control region UC.

Apart from the control information communication region, the remaining interval of the frame is assigned as a media information transmission region MIT. Various data is transmitted via the media information transmission region MIT based on an access control from the wireless communication apparatus 104 (the control station). The media information transmission region MIT is divided by a predetermined unit into slots 1 to 16. The slot is a unit used for performing band reservation transmission in which the wireless communication apparatus 104 (the control station) arbitrarily assigns a slot from among the slots and reserves it in order to perform isochronous wireless communication.

When the slot assignment for the band reservation transmission is not performed, instead of the isochronous information, asynchronous information may be arranged so as to be wirelessly transmitted.

Figure 3:
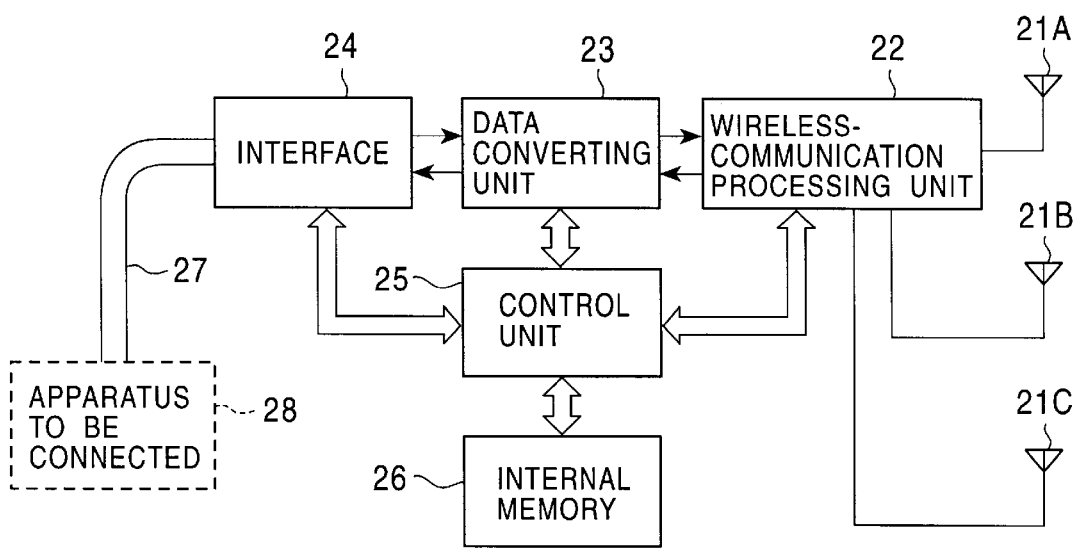
FIG. 3 is a block diagram showing a wireless transmission apparatus in the wireless network system according to the embodiment.

FIG. 3 shows an example construction of each of the wireless communication apparatuses 101 to 104. Each of the wireless communication apparatuses 101 to 104 has a common construction in which antennas 21A, 21B, and 21C for transmitting and receiving signals, and a wireless-communication processing unit 22 for performing wireless transmission processing and wireless reception processing are provided so that the wireless communication can be performed therebetween.

In this example, the antennas 21A, 21B, and 21C constitute an antenna diversity construction. That is, when the wireless communication apparatuses 101 to 104 which constitute the network communicate with each other, these antennas 21A to 21C are constructed so that the optimal antenna should be selected beforehand from among the antennas 21A to 21C.

In this case, as a communication method performing transmission and reception at the wireless-communication processing unit 22, a communication method using multi-carrier signals, a so-called "Orthogonal Frequency Division Multiplex" (OFDM) method, may be used. As an operating frequency, for example, a very high frequency band (such as a 5 GHz band) may be used.

For example, when the wireless communication apparatuses are used indoors, transmission outputs thereof are set to be so weak that wireless communication is only performed between the wireless communication apparatuses which are at a relatively short distance (between several meters and several tens of meters) from each other.

The wireless communication apparatus further includes a data converting unit 23 for converting a signal received from the wireless-communication processing unit 22 or a signal to be transmitted via an interface 24 from the wireless-communication processing unit 22 to an apparatus 28. The wireless communication apparatus is constructed so that data converted by the data converting unit 23 is supplied to a processing unit of the apparatus 28 while the data supplied from the processing unit of the apparatus 28 is transmitted via the interface 24 to the data converting unit 23 in which conversion processing is performed.

Voice, image, or various data information is arranged to be exchanged between the wireless communication apparatus and the apparatus 28 via a high-speed serial interface 27 such as an IEEE-1394 interface which serves as an external interface of the interface 24. Alternatively, these wireless communication apparatus may be incorporated in the apparatus 28.

Each component of the wireless communication apparatus operates under the control of the control unit 25 including a microcomputer. When the wireless-communication processing unit 22 receives a control signal such as wireless band reservation information, the received control signal is supplied via the data converting unit 23 to the control unit 25 in which each component is set based on the received control signal.

The control unit 25 is connected to an internal memory 26 which temporarily stores data necessary for communication control, reserved slot information, and the like.

When the wireless-communication processing unit 22 receives a synchronizing signal, the control unit 25 establishes a frame period by determining a reception timing of the synchronizing signal and performs communication control processing using the established frame period.

The control unit 25 communicates with other wireless communication apparatuses. The control unit 25 supplies the control signal such as wireless band reservation information to the wireless-communication processing unit 22 via the data converting unit 23, so that wireless communication can be performed.

FIG. 4 shows the structure of a packet used for requesting band reservation. The band-reservation request packet includes a packet ID identifying this packet as a band-reservation request packet; a reservation station ID identifying a wireless communication apparatus reserving the band; a source ID identifying a source wireless communication apparatus transmitting this packet; a destination ID identifying a destination wireless communication apparatus receiving this packet; a request ID attached every time a reservation request is issued; and reservation bandwidth information indicating, in units of cable cycles, information on the width of the reserved band. Other than these, various information may be attached to the packet when needed.

FIG. 5 shows the structure of the packet which reports the band assignment. The band assignment packet includes a packet ID representing this packet as the band assignment packet; a reservation station ID identifying a wireless communication apparatus reserving the communication band; a source ID identifying a source wireless communication apparatus transmitting this packet; a destination ID identifying a destination wireless communication apparatus receiving this packet; a request ID attached every time a reservation request is issued; reservation bandwidth information indicating, in units of cable cycles, information on the width of the reserved band; a reservation ID established every time a band is assigned; and slot assignment information indicating slots obtained by band assignment. Other than these, various information may be attached to this packet when needed.

This reservation bandwidth information represents the maximum transmission amount during one cable cycle. The size of the buffer region for one cycle corresponds to the reservation bandwidth information. When the band assignment is acknowledged, it is preferable to use this structure of the assignment packet as that of a band assignment acknowledgement packet obtained by changing only the packet ID so that the packet ID represents the acknowledgement packet.

Figure 6:
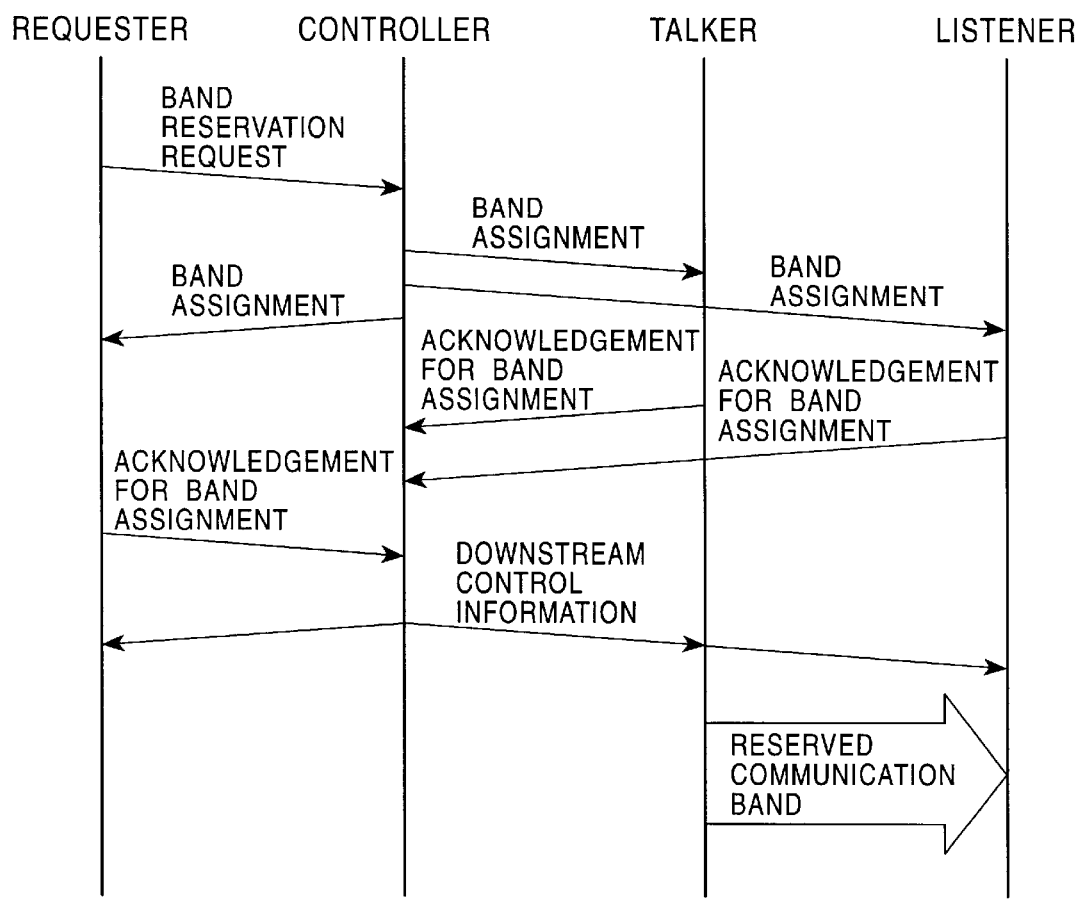
FIG. 6 is a diagram illustrating a procedure for reserving a wireless transmission band (transmission slot) according to the embodiment.

FIG. 6 shows a procedure for reserving the wireless communication band. In FIG. 6, a communication station that reserves the communication band (requester), a control station that performs assignment (controller), a communication station that transmits information (talker), and a communication station that receives information (listener)

are independently illustrated. However, one communication station may be equipped with several functions from among these functions. For example, the requester and the talker may be identical, or the controller and the listener may be identical.

Initially, when receiving a request from a cable-communication channel that band reservation transmission must be performed, the requester issues a slot request (band reservation request) to the controller via a wireless channel. That is, the band reservation request packet (slot request) shown in FIG. 4 is transmitted to the controller.

When the controller receives the slot request and when it is possible for the controller to perform band assignment, the controller issues slot assignment (band assignment) to the requester, the talker, and the listener. That is, the slot assignment (band assignment) packet shown in FIG. 5 is transmitted from the controller. In a case in which one communication apparatus is equipped with several functions among the above-described functions, only at least one of the packets may be transmitted thereto.

When the corresponding communication station receives the slot assignment, it replies with a slot assignment acknowledgement (band assignment acknowledgement) to the control station. It is convenient for each of the talker and the listener to establish a communication buffer in units of cable cycles based on the reservation bandwidth information contained in this slot assignment packet.

When receiving slot assignment acknowledgements from all of the corresponding communication stations, the control station reports using the downstream control region DC that the corresponding communication band (slot) is assigned for band reservation transmission, whereby the band reservation transmission starts.

Figure 7:
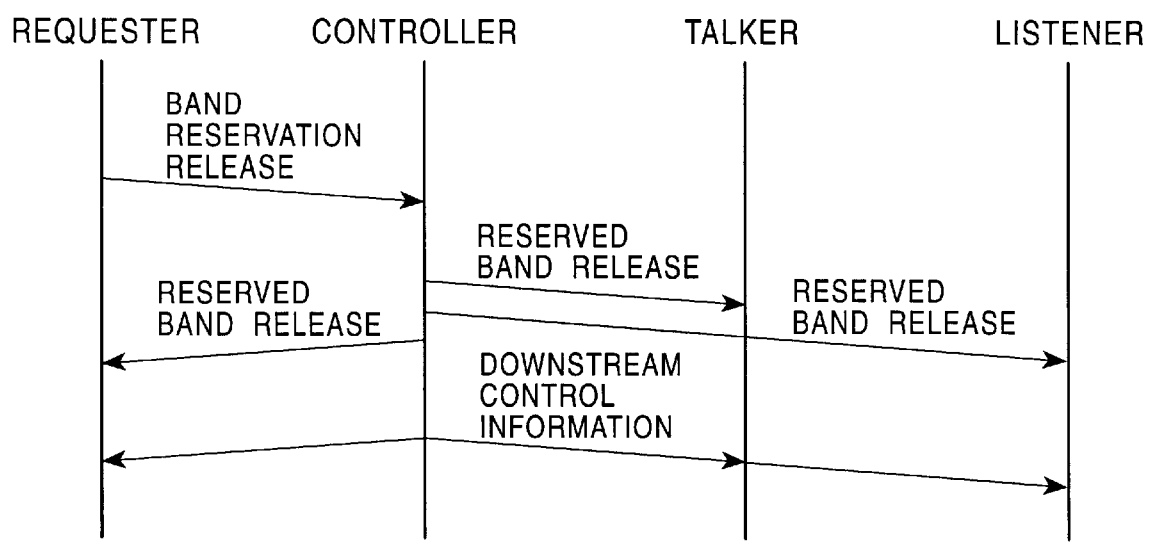
FIG. 7 is a diagram illustrating a procedure for releasing the wireless transmission band (transmission slot) according to the embodiment.

FIG. 7 shows a procedure for releasing the wireless band. In FIG. 7, a communication station that reserves the communication band (requester), a control station that performs assignment (controller), a communication station that transmits information (talker), and a communication station that receives information (listener) are independently illustrated. However, one communication station may be equipped with several functions from among these functions.

Initially, when receiving a report from the cable-communication channel that the band reservation transmission is complete, the requester issues a slot release packet to the controller via the wireless communication channel. When receiving the slot release packet, the controller issues a slot open packet to the requester, the talker, and the listener. In a case in which one communication apparatus is equipped with several functions among the above-described functions, only at least one of the packets may be transmitted.

The band reservation release (slot release) is reported using the downstream control region DC. The band reservation release packet which is transmitted to the control station at the time of the band reservation release is identical to a packet obtained by replacing the packet ID of the band reservation request packet (shown in FIG. 4) with an ID representing reserved band release.

FIGS. 8A to 8E show a procedure in which cable-environment isochronous data substantially periodically transmitted in the isochronous mode is converted into wireless-environment frame-periodic data for and the converted frame-periodic data is wirelessly transmitted in units of blocks.

Figure 8:
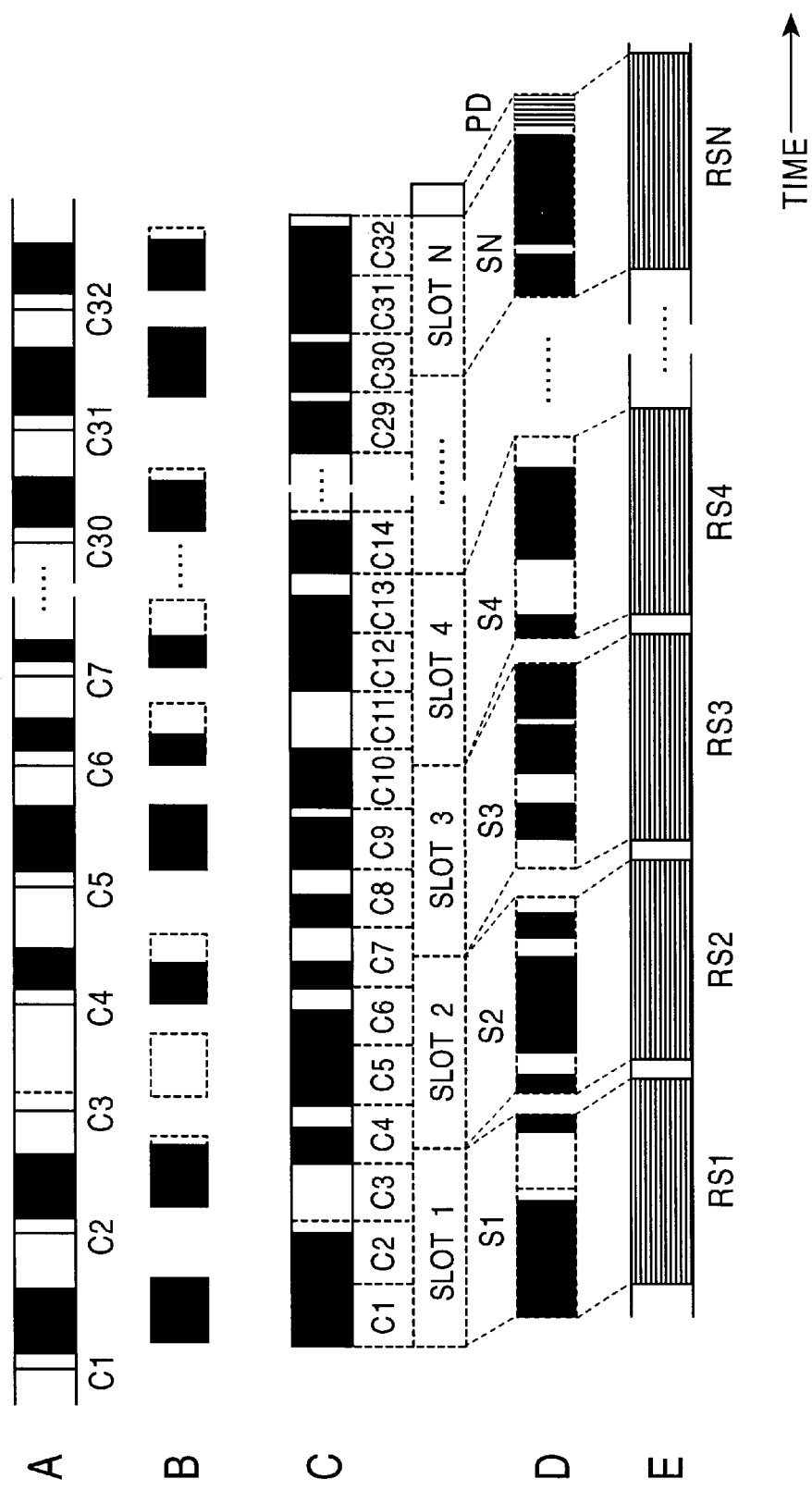
FIG. 8 is a timing chart showing an example conversion of cable isochronous information according to the embodiment.

FIG. 8A shows the isochronous communication information transmitted via the high-speed serial bus. In FIG. 8A, thirty-two cable environment cycles constitute one wireless environment frame. Cable isochronous communication packets are periodically transmitted at cycles C1, C2, C3, ... C31, and C32.

FIG. 8B shows the isochronous communication packet information extracted from the above-described packets. Reserved bands are denoted with broken rectangles and the amount of information which is shown as data length information is denoted with rectangles shaded. That is, there are shown cycles C2, C4, C6, C7, ..., C30, and C32 in which the packet information of the cycle does not occupy the entirety of the reserved band; cycles C1, C5, ..., and C31 in which the packet information of the cycle occupies the entirety of the reserved band; and cycles C3, ... in which no information is contained in the cycle.

FIG. 8C shows a procedure for constructing a wireless-environment packet. A buffer whose size corresponds to thirty-two cable cycles as a unit of the reserved band is provided in units of cable cycles. Information of each cycle is sequentially stored for the size of this fixed buffer in the buffer, starting from the beginning thereof. The buffer whose information (one frame) corresponds to those of thirty-two cycles is divided into unit slots, each of which is established for the wireless environment.

As shown in FIG. 8D, a packet is constructed by packing information of a plurality of cycles and dividing the packed information in units of slots, each of which is a wireless-environment unit. That is, cycles C1, C2, C3, and a part of C4 constitute slot S1; the rest of cycle C4 and cycles C5, C6, and a part of C7 constitute slot S2; the rest cycle of C7 and cycles C8, C9, and a part of C10 constitute slot S3; the rest of cycle C10 and cycles C11, C12, and C13 constitute slot S4; and a part of cycle C30 and cycles C31 and C32 constitute slot SN. When slot SN cannot be divided by thirty-two, the remainder PD (padding) may be filled with zeros if necessary.

FIG. 8E shows the structure of a packet to be transmitted via the wireless environment. When needed, block coding error-correcting codes RS1, RS2, RS3, RS4, ..., and RSN are attached to wireless communication blocks S1, S2, S3, S4, ..., and SN, respectively. After the block information is attached to the corresponding wireless-environment reserved slot, the wireless transmission starts.

FIGS. 9A to 9E show a procedure in which, using the reserved slot, the block information of a wireless frame periodically transmitted via the wireless channel is restored (converted) to the isochronous information in units of cable cycles and the restored isochronous information is transmitted in the isochronous mode.

Figure 9:
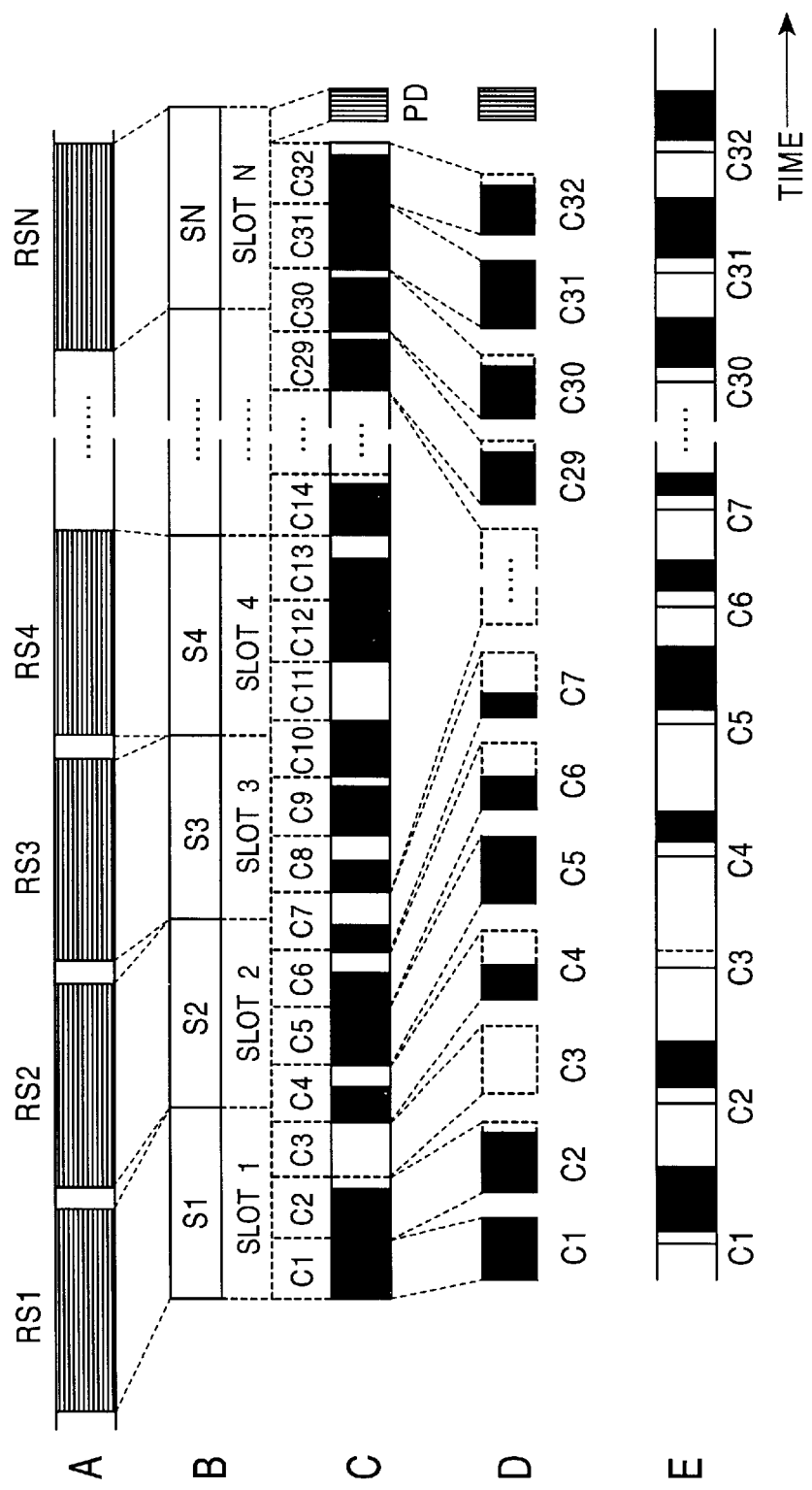
FIG. 9 is a timing chart showing an example conversion of wireless isochronous information according to the embodiment.

Initially, FIG. 9A shows a packet for data communication transmitted via the wireless environment. In FIG. 9A, N slots of data packets S1, S2, ..., SN have block coding error-correcting codes RS1, RS2, RS3, RS4, ..., RSN attached thereto, respectively, when needed.

FIG. 9B shows necessary information extracted from the block data packets. The information is extracted all together in units of wireless-environment frames. In FIG. 9B, the block coding error-correcting codes RS1, RS2, RS3, ..., RSN are removed from the information.

FIG. 9C shows a procedure for constructing cable-environment isochronous data. Since one wireless-environment frame constitutes thirty-two cable-environment cycles, isochronous communication packets are restored in units of cable cycles (C1, C2, C3, ..., C31, C32). That is, cycles C1, C2, and C3 are constructed from slot S1; cycle C4 is constructed from a part of slot S1 and a part of slot S2;

cycles C5 and C6 are constructed from slot S2; cycle C7 is constructed from a part of slots S2 and a part of slot S3; cycles C8 and C9 are constructed from slot S3; cycle C10 is constructed from a part of slot S3 and a part of slot S4; cycles C11, C12, and C13 are constructed from slot S4; a part of cycle C30, and cycles C31 and C32 are constructed from slot SN; the remainder PD of slot SN is discarded.

FIG. 9D shows isochronous communication data information extracted in units of cable cycles from the above-described packet. Reserved bands are denoted with broken rectangles and the amount of information which is shown as data length information is denoted with filled rectangles.

In FIG. 9D, there are shown cycles C2, C6, C7, . . . , C29, C30, and C32 in which the packet information of the cycle does not occupy the entirety of the reserved band; cycles C1, C5, . . . , and C31 in which the packet information of the cycle occupies the entirety of the reserved band; cycles C1, . . . in which packet information of the cycle is not contained.

When transmission is performed, not all reserved bands are transmitted. The data length of the packet of each cycle is obtained based on the data length information attached in the isochronous communication packet, so that reserved bands are converted as isochronous communication packets.

FIG. 9E shows isochronous communication information transmitted on the high-speed serial bus. The isochronous communication packets C1, C2, C3, . . . , C31, and C32 which are restored from the wireless-environment frame are sequentially transmitted to the high-speed serial bus every cycle period.

Figure 12:
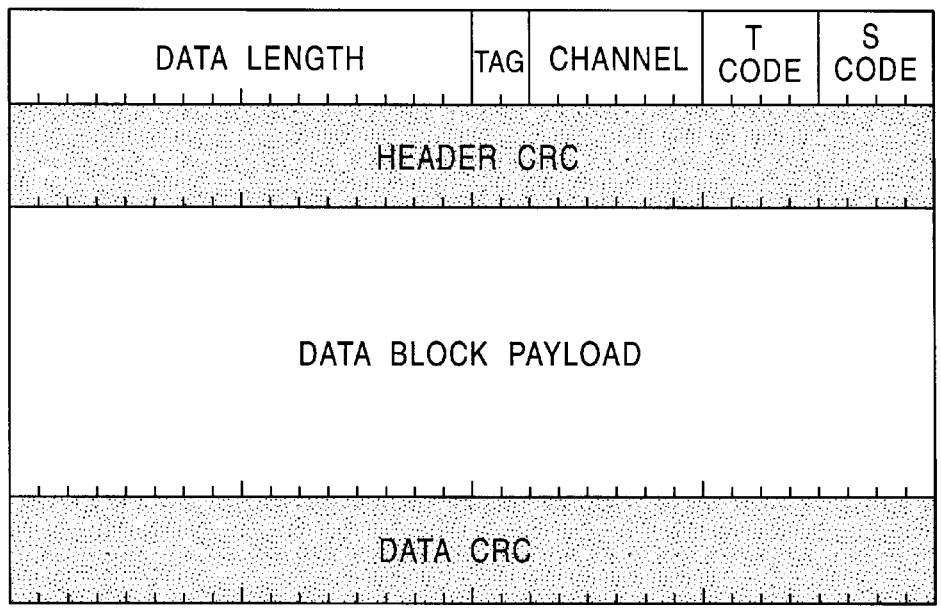
FIG. 12 is an enlarged view of a part of the structure of the cable isochronous information in FIG. 10.

FIG. 10 shows the structure of the isochronous communication information transmitted via the cable-environment. This structure corresponds to that of the packet data used for the isochronous transfer for the IEEE-1394 high-speed serial bus interface. FIG. 12 shows an enlarged view of a part of the structure in FIG. 10.

Specifically, the isochronous information includes a data length, a tag representing that the packet data is used for the isochronous transfer mode, a T code (transaction code), an S code (synchronization code), a header CRC (Cyclic Redundancy Check), data block payload (data field) which is data to be transmitted, and CRC for the data to be transmitted (data CRC).

Figure 11:
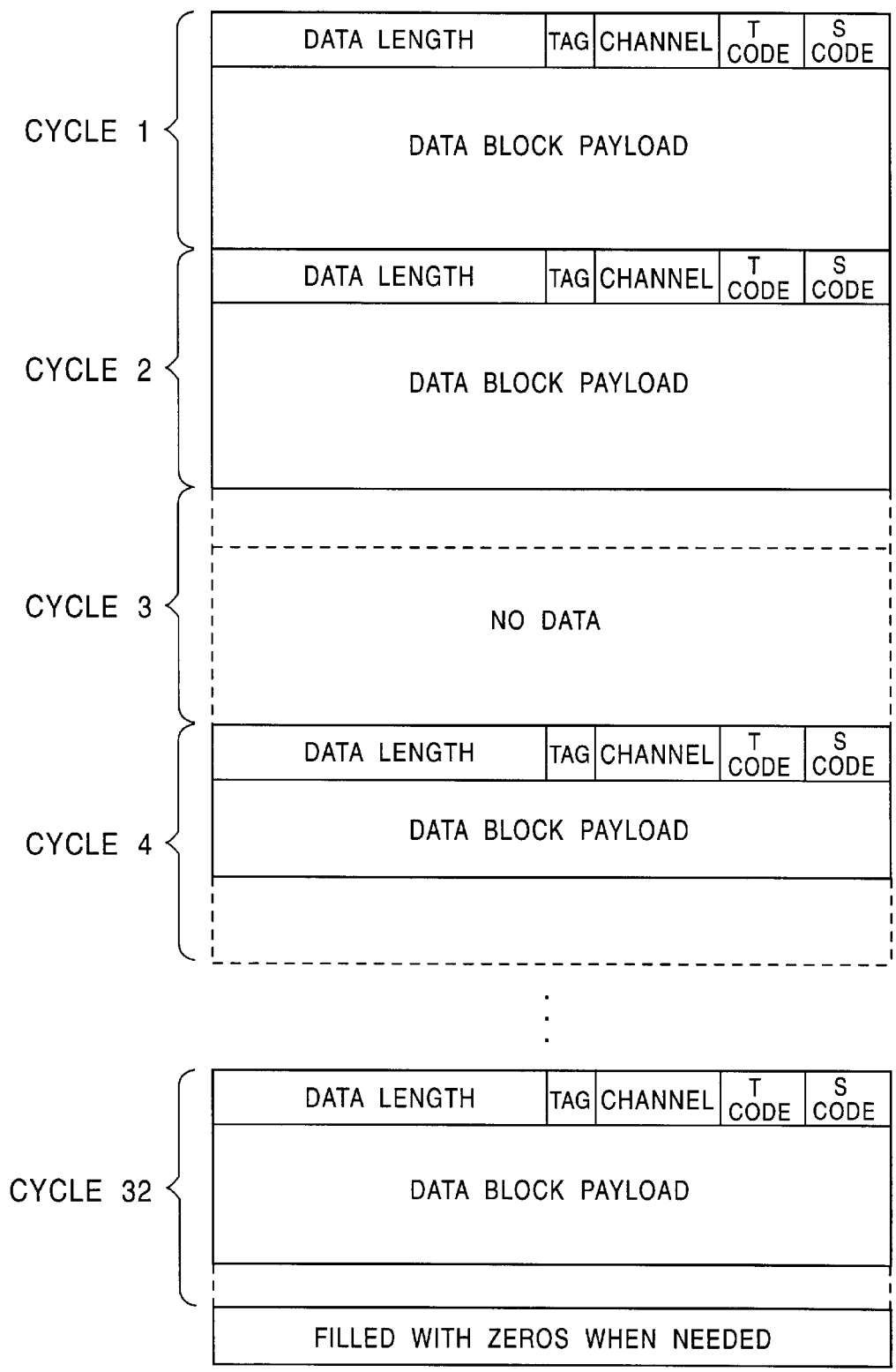
FIG. 11 is a diagram illustrating an example structure of the wireless isochronous information according to the embodiment.
Figure 13:
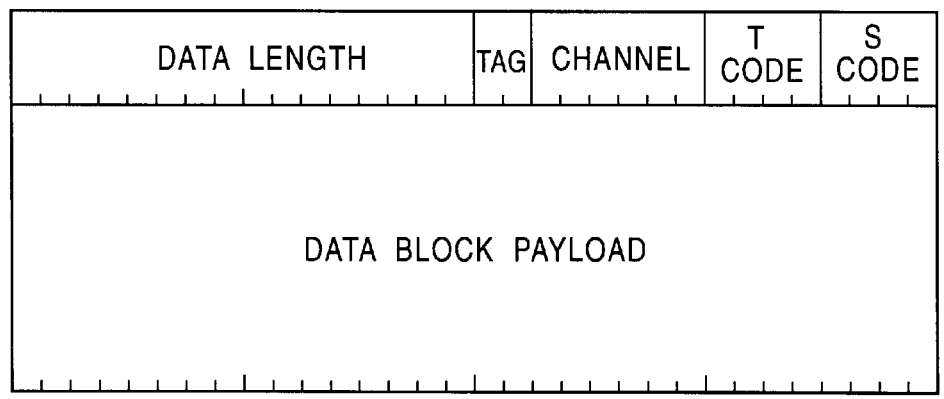
FIG. 13 is an enlarged view of a part of the structure of the wireless isochronous information in FIG. 11.

FIG. 11 shows the structure of block data to be wirelessly transmitted. The structure corresponds to that of the block data in which reserved slots are periodically transmitted in units of established wireless frames. In FIG. 11, information corresponding to thirty-two cycles is assumed to be converted into a wireless transmission format. FIG. 13 shows an enlarged view of a part of the structure in FIG. 11.

The data block corresponding to thirty-two cycles in FIG. 11 (FIG. 13) is obtained by packing isochronous communication information shown in FIG. 10 (FIG. 12) and removing the header CRC and the data CRC from the packed information. That is, isochronous information which contains information on the channel number in which wireless transmission must be performed therethrough is constructed as block data by packing information corresponding to thirty-two cycles.

Since there is information on the size of the packet as the data length in the isochronous communication information, the isochronous communication information having a size which is more than the amount of information reserved beforehand as the communication band is not transmitted.

Accordingly, a fixed buffer region is provided having a size of this reserved band and information is buffered in the fixed buffer region starting from cycle 1. When the data length is equal to the size of the fixed-length buffer region (e.g., cycle 1 in FIG. 11), information buffered in the fixed-length buffer region occupies the entirety thereof.

When the size of the information is less than that of the fixed-length buffer, instead of storing subsequent data in the rest of the buffer, the subsequent data is stored in the fixed-length buffer corresponding to the next cycle starting from the top thereof (e.g., cycle 2, cycle 4, . . . , and cycle 32 in FIG. 11).

When a cycle bears no information, the buffer region corresponding to the cycle is skipped in order to indicate there is no data in it (e.g., cycle 3 in FIG. 11).

When the size of information is less than that of the fixed-length buffer, the rest of the buffer is filled with zeros, as shown in FIG. 11, when needed.

Figure 14:
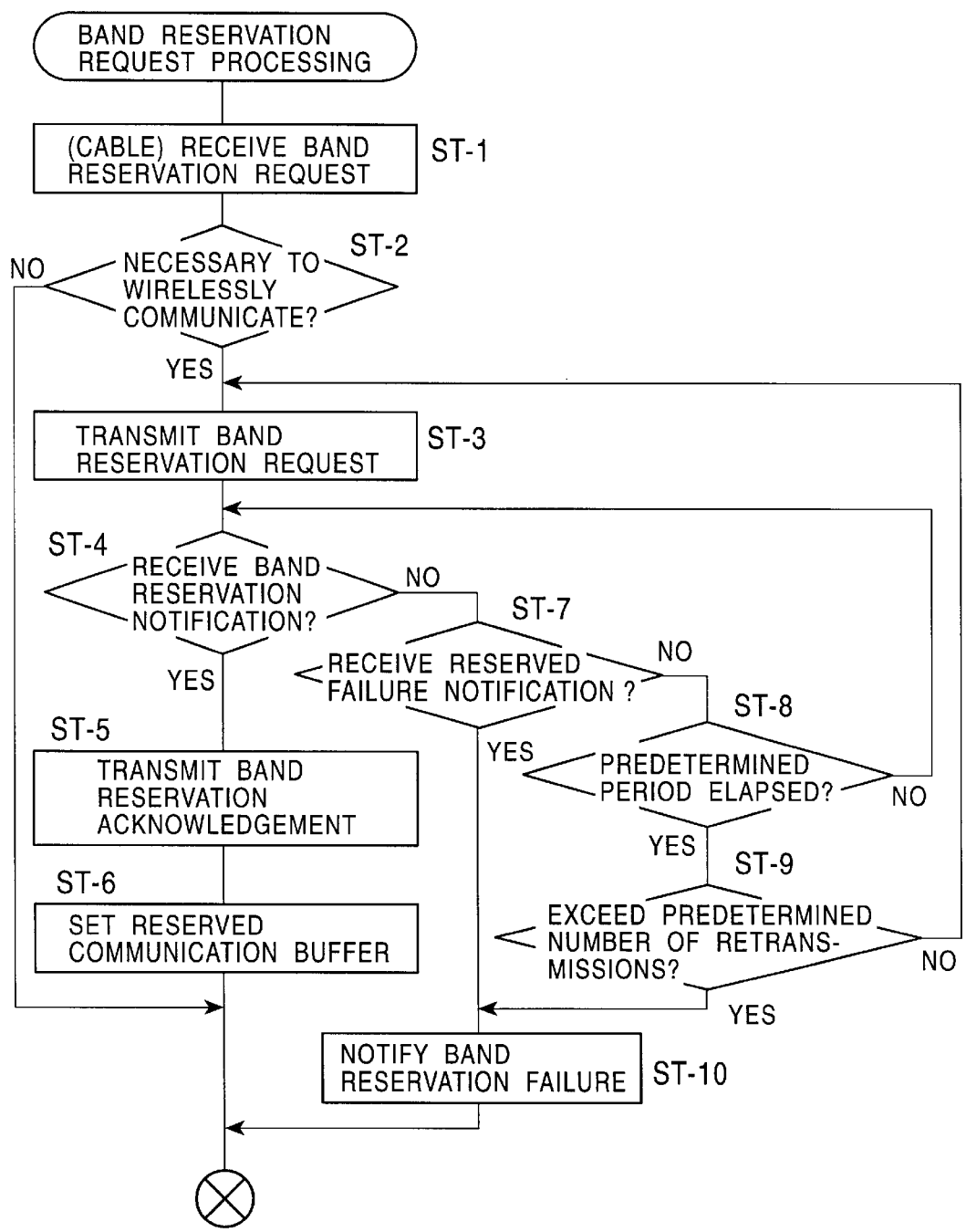
FIG. 14 is a flowchart showing operations of the wireless transmission band reservation request according to the embodiment.

FIG. 14 shows a flowchart of processing in which a communication station requests the band reservation for the wireless-environment. Initially, at step ST-1, the interface 24 (FIG. 3) of the wireless communication apparatus receives the band reservation request transmitted via the cable-environment.

At step ST-2, the process determines whether the band reservation transmission must be performed via the wireless-communication channel. If the result of the determination is negative, the process terminates; otherwise, the process proceeds to step ST-3. At step ST-3, the band reservation request for the wireless transmission is sent to the control station of the WNT. At step ST-4, the process determines whether a band reservation notification for the wireless communication (see step ST-3 in FIG. 15) is received from the control station within a predetermined period.

When the notification is received at step ST-4, the process proceeds to step ST-5 in which the band reservation acknowledgement for the wireless communication is sent to the control station. At ST-6, when needed, the buffer region for the band reservation transmission is provided and the band reservation transmission is prepared, and the process terminates.

When the notification is not received at step ST-4, the process proceeds to step ST-7. At step ST-7, the process determines whether band reservation failure notification for the wireless communication is received from the control station within a predetermined period (see step ST-9 in FIG. 15).

When the failure notification is received, since the band reservation is impossible, the process proceeds to step ST-10 in which the band reservation failure is reported to the cable-communication side and the process terminates.

When the failure notification is not received, at step ST-8, the process determines whether a predetermined period has passed. When the result of the determination is negative, the process proceeds back to step ST-4 and determines whether the band reservation notification is received. When no notification is received within the predetermined period at step ST-8, the process proceeds to step ST-9 and determines whether the number of retries of executing this step exceeds a predetermined retransmission number.

When the number of retires does not exceed the retransmission number, the process proceeds to step ST-3 in which, once again, the control station is requested to reserve the communication band.

When the number of retires exceeds the retransmission number, which means that the band reservation cannot be performed, the process proceeds to step ST-10 in which band reservation failure is reported to the cable-communication side, and the process terminates.

Figure 15:
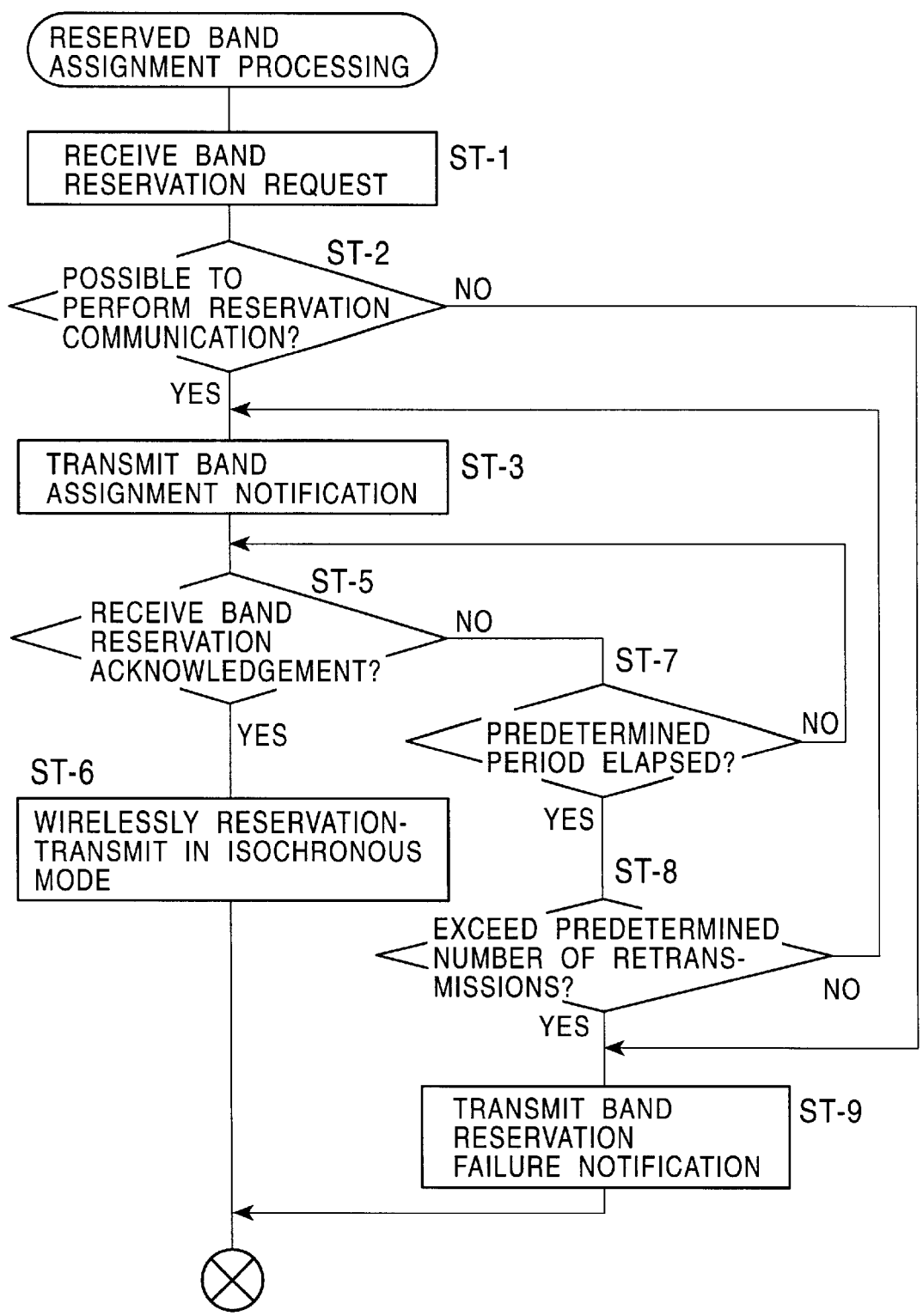
FIG. 15 is a flowchart showing operations of the wireless transmission band assignment according to the embodiment.

FIG. 15 shows a flowchart of band reservation assignment processing of the control station. Initially, at step ST-1, the band reservation request (see step ST-3 in FIG. 14) is received from a communication station which performs the band reservation transmission for the wireless transmission.

At step ST-2, the process determines whether the band reservation can be requested. If the reservation is impossible, the process proceeds to step ST-9 in which the band reservation failure is notified to the communication station which requests the band reservation, and the process terminates.

If the reservation is possible, at step ST-3, the band assignment notification is sent to the communication station which requests the wireless band assignment. A transmission notification for the corresponding band reservation transmission is sent to a communication station which sends the band reservation transmission and a reception notification for the corresponding band reservation transmission is sent to a communication station which receives the band reservation transmission.

Figure 16:
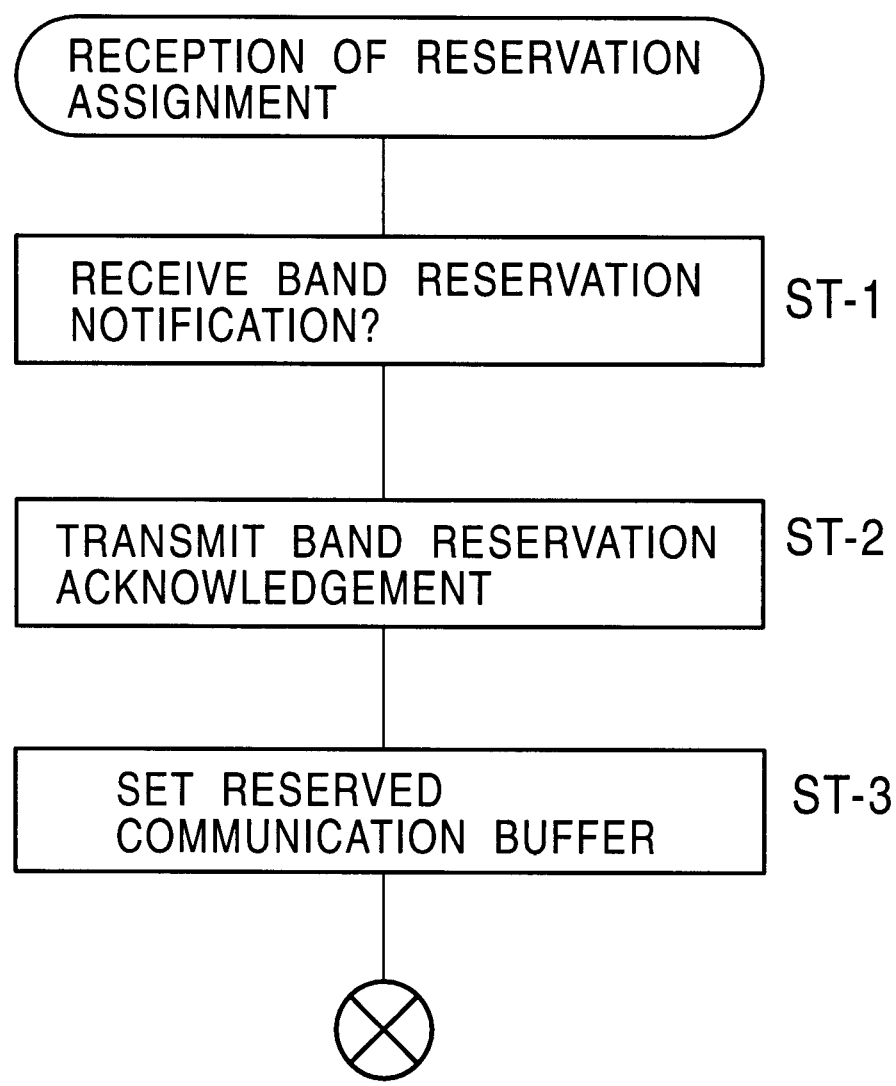
FIG. 16 is a flowchart showing operations of the wireless transmission band reservation notification according to the embodiment.

In order to determine whether the corresponding communication stations receive these notifications, at step ST-5, the process determines whether the control station receives the wireless band reservation acknowledgements from the corresponding opposing communication stations (step ST-5 in FIG. 14 and step ST-2 in FIG. 16).

When all reservation acknowledgements are received within a predetermined period, the process proceeds to step ST-6 in which information on a slot newly established as the downstream control region information is wirelessly transmitted throughout the network in the isochronous mode, and the process terminates.

At step ST-5, if the result of the determination is negative, the process proceeds to step ST-7 and determines whether the predetermined period has passed. If the result of the determination is negative, the process proceeds to step ST-5 and determines whether the band reservation acknowledgement is received. When, at step ST-7, the process determines that not all acknowledgements are received within the predetermined period, the process proceeds to step ST-8 and determines whether the number of retries of this step exceeds the predetermined retransmission number.

When the number of retries does not exceed the retransmission number, the process proceeds to step ST-3 in which, once again, the wireless band assignment notification, the transmission notification, and the reception notification are sent to the corresponding communication stations. At this time, there is no need to notify the communication stations which already acknowledged. When the number of retries exceeds the retransmission number, the process proceeds to step ST-9 in which wireless band assignment failure is sent to a communication station which sends the acknowledgement, and the process terminates.

FIG. 16 shows a flowchart of processing when a communication station on the reception side which is notified from the control station receives the reservation band assignment.

Initially, at step ST-1, the band reservation notifications (see step ST-3 in FIG. 15) wirelessly transmitted from the control station are received. The communication station on the sending side receives the transmission notification and the communication station on the receiving side receives the reception notification.

At step ST-2, the wireless band reservation acknowledgements are replied to and sent to the control station. At step ST-3, the process sets the reserved band buffer and terminates.

Figure 17:
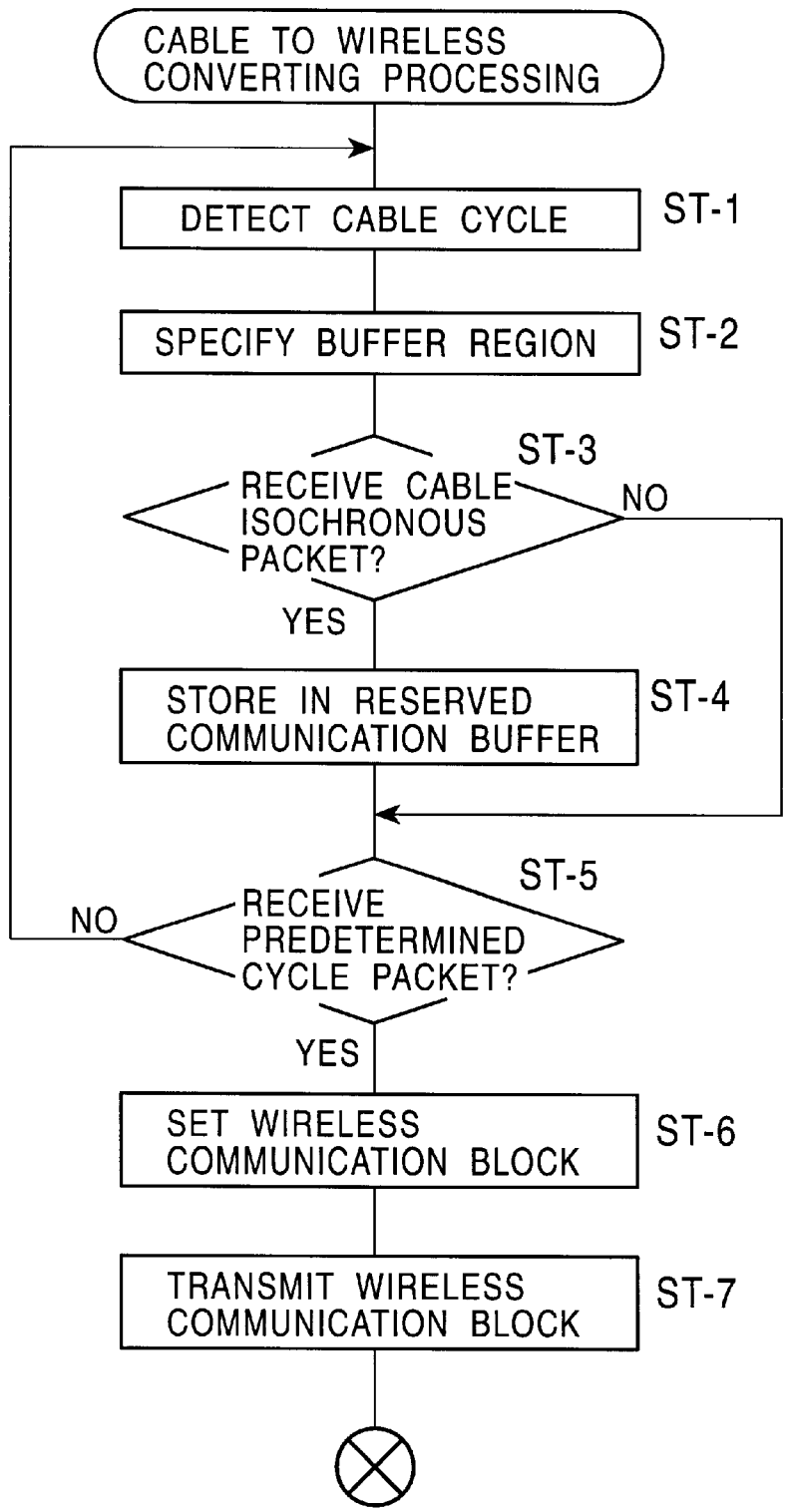
FIG. 17 is a flowchart showing operations of the band reservation wireless transmission according to the embodiment.

FIG. 17 shows a procedure for converting cable isochronous packets into wireless blocks.

At step ST-1, the process detects a unit of communication which is transmitted substantially periodically in the isochronous mode by detecting a cable cycle. Alternatively, the process may detect the unit of communication by detecting a cycle start packet.

At step ST-2, the process specifies the reservation communication buffer. That is, the buffer region to be wirelessly transmitted is determined in accordance with the order of cycles. The reservation communication buffer is provided at step ST-6 in FIG. 14 and at step ST-3 in FIG. 16.

At step ST-3, the process determines whether an isochronous packet exists in a cycle. When the packet is received, at step ST-4, the isochronous information of the packet is stored in the reservation communication buffer. When a packet is not received, this step is skipped.

At step ST-5, the process determines whether buffer regions whose number is equal to the number of cycles corresponding to a wireless frame period are filled. When the number of the filled buffer regions does not exceed the predetermined cycle number, the process proceeds back to step ST-1. The process repeats the above-described steps until the number of the filled buffer regions reaches the predetermined cycle number. When the number of the filled buffers reaches the predetermined cycle number, at step ST-6, the process sets a wireless communication block and constructs a wireless communication packet.

At step ST-7, the process performs wireless transmission using a reserved band slot in accordance with a predetermined format. A series of wireless transmissions continuously repeats while the isochronous transmission is performed.

Figure 18:
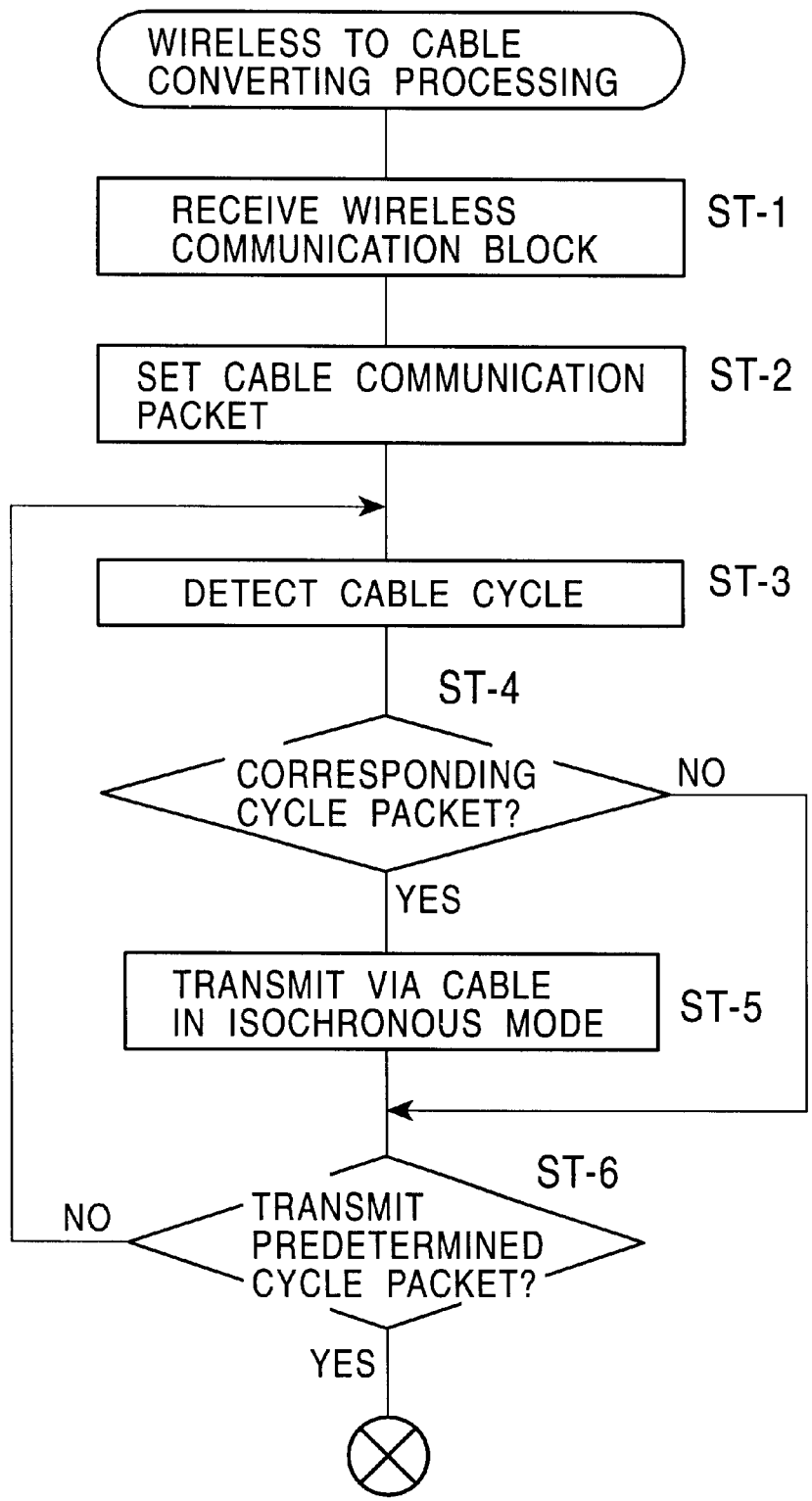
FIG. 18 is a flowchart showing operations of the band reservation wireless reception according to the embodiment.

FIG. 18 shows a procedure in which information transmitted in the wireless band reservation manner is transmitted in the isochronous mode via a cable.

At step ST-1, a wireless transmission block wirelessly transmitted in accordance with a predetermined format is received. At step ST-2, a cable isochronous packet is restored (converted) every cycle in accordance with a predetermined buffer format. At step ST-3, the process detects a communication unit transmitted substantially periodically in the isochronous mode by detecting the cable cycle.

At step ST-4, the process determines whether the isochronous packet to be transmitted exists in the corresponding detected cable cycle. When the packet to be transmitted exists, at step ST-5, the packet is transmitted to a cable communication channel based on a predetermined access control procedure. When the packet to be transmitted does not exist in the detected cable cycle, the step is skipped.

At step ST-6, the process determines whether transmission of packets whose number of cycles corresponds to the wireless frame period is complete. When the transmission of packets is not complete, the process proceeds to step ST-3. The process repeats the above-described steps until transmission of all packets corresponding to the number of cycles is complete, and the process terminates.

A series of cable transmission continuously repeats while the isochronous transmission is performed.

What is claimed is:

1. A wireless communication method for a control station controlling a wireless network including the control station and at least one communication station including a terminal having an operating device, the wireless communication method comprising the steps of:

receiving by wireless communication a communication band reservation request from a communication station that desires to perform isochronous communication, wherein the communication station is connected by a cable to a terminal having an operating device;

assigning a wireless communication band for the communication station and notifying the communication station by wireless communication of a communication band assignment when the band can be reserved; and allowing the communication station to perform isochronous communication over to cable to the operating device using information received by wireless communication in the assigned wireless communication band when the band can be reserved.

2. The wireless communication method according to claim 1, wherein the control station transmits by wireless communication a notification of the communication band assignment to a source communication station of the network that desires to perform isochronous communication and by wireless communication to a destination communication station of the network.

3. The wireless communication method according to claim 1, further comprising the step of releasing the assigned wireless communication band when the isochronous communication terminates.

4. The wireless communication method according to claim 1, wherein, in the step of allowing the isochronous communication to be performed, said control station establishes a frame period for a wireless environment and transmits data arranged in units of blocks based on a predetermined format obtained by assigning a fixed region to the data in units of wireless-environment frame periods.

5. A wireless communication method for a communication station including a terminal connected thereto by a high speed bus and used in a wireless network including a control station and at least one other communication station, the wireless communication method comprising the steps of:

transmitting by wireless communication to the control station a band reservation transmission request to make an isochronous transmission from one terminal communication station of the network to another terminal communication station that is connected to an operating device via a high-speed bus;

receiving by wireless communication a communication band assignment notification from said control station; and performing isochronous transmission in the communication band assigned in accordance with said communication band assignment notification, so that information transmitted by isochronous transmission is supplied to the operating device.

6. A wireless communication apparatus comprising:

wireless reception means for receiving a wireless communication establishing a predetermined wireless communication data structure and for receiving by wireless communication wireless communication band assignment information;

cable reception means for receiving over a cable isochronous communication information transmitted from devices connected thereto via a high-speed bus on the cable;

information converting means for converting said isochronous communication information into data information arranged in units of blocks based on a predetermined format established in accordance with said wireless communication band assignment information received by said wireless reception means; and wireless transmission means for performing a wireless transmission of said data information.

7. A cable communication apparatus comprising:

first wireless reception means located at a control station for receiving a wireless communication establishing a predetermined wireless communication data structure and for receiving by wireless communication wireless communication band assignment information;

second wireless reception means located at a terminal for receiving by wireless communication data information transmitted via a predetermined wireless communication channel;

information converting means for converting wireless communication data information arranged in units of blocks based on a predetermined format established in accordance with said wireless communication band assignment information received by said first wireless reception means at the control station into periodic isochronous communication information for a cable communication environment; and cable transmission means for transmitting the isochronous communication information to devices connected to the terminal via a high-speed bus connected to the terminal.

8. A wireless communication apparatus comprising:

information detecting means located at a terminal for detecting isochronous communication band reservation information transmitted from devices connected to the terminal via a high-speed bus;

first wireless transmission means located at a terminal for performing wireless transmission to a wireless communication apparatus serving as a control station of a request for acquiring a wireless communication band required for wireless communication based on the detected isochronous communication band reservation information;

wireless reception means for receiving a wireless communication establishing a predetermined wireless communication data structure and for receiving by wireless communication wireless communication band assignment information;

cable reception means located at another terminal for receiving isochronous communication information transmitted from devices connected to the terminal via the high-speed bus;

information converting means for converting said isochronous communication information into data information arranged in units of blocks based on a predetermined format established in accordance with said wireless communication band assignment information received by said wireless reception means; and second wireless transmission means for performing wireless transmission of said data information.

9. A cable communication apparatus comprising:

wireless reception means for receiving a wireless communication establishing a predetermined wireless communication data structure and for receiving wireless communication band acquiring request information transmitted by wireless communication from a wireless communication apparatus;

first wireless transmission means located at a control center for performing wireless transmission of wireless communication band assignment information based on said wireless communication band acquiring request information received by said wireless reception means;

cable reception means located at a terminal for receiving isochronous communication information transmitted from devices connected to the terminal via a high-speed bus;

information converting means for converting said isochronous communication information into data information arranged in units of blocks based on a predetermined format established in accordance with said wireless communication band assignment information from said first wireless transmission means; and second wireless transmission means located at the terminal for performing wireless transmission of said data information.

10. A cable communication apparatus comprising:

first wireless reception means located at a control station for establishing a predetermined wireless communication data structure and receiving wireless communication band acquiring request information transmitted from a wireless communication apparatus located at a terminal;

wireless transmission means for performing wireless transmission of wireless communication band assignment information based on said wireless communication band acquiring request information received by said first wireless reception means;

second wireless reception means located at another terminal for receiving data information transmitted via a predetermined wireless communication channel;

information converting means located at the other terminal for converting the data information arranged in units of blocks based on a predetermined format established in accordance with said wireless communication band assignment information into periodical cable-environment isochronous communication information; and cable transmission means located at the other for transmitting the cable-environment isochronous communication information to devices connected to the other terminal via a high-speed bus.

* * * * *